July 23, 1946.　　　　J. A. HERBST　　　　2,404,377
ADJUSTMENT DEVICE
Filed Jan. 3, 1944
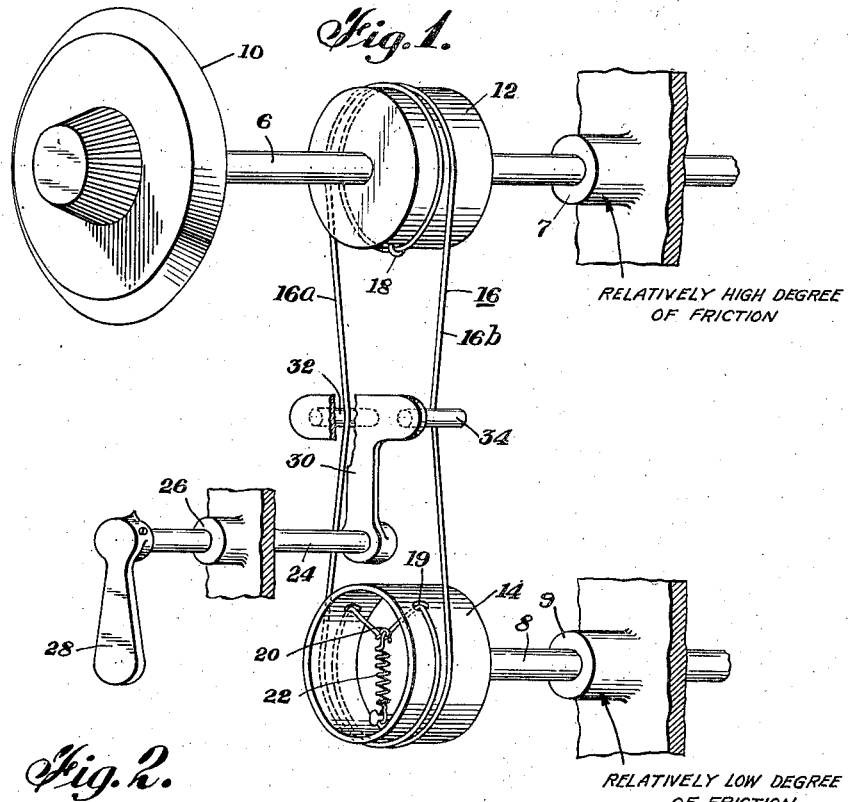
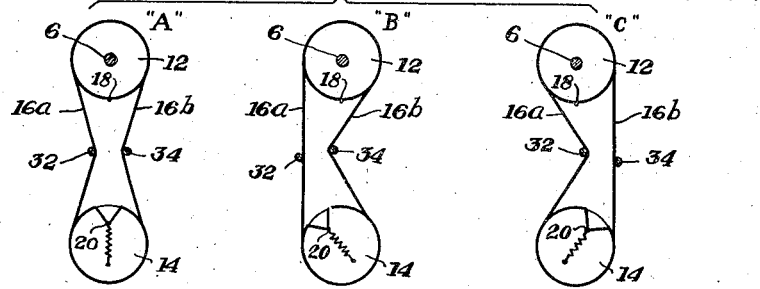
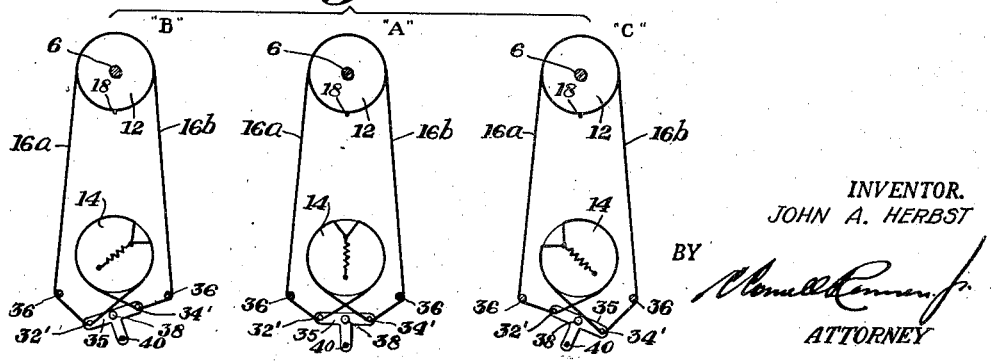
INVENTOR.
JOHN A. HERBST
BY
ATTORNEY Patented July 23, 1946

2,404,377

UNITED STATES PATENT OFFICE 2,404,377

ADJUSTMENT DEVICE

John A. Herbst, Oradell, N. J., assignor to Federal Telephone and Radio Corporation, New York, N. Y., a corporation of Delaware Application January 3, 1944, Serial No. 516,876

14 Claims. (Cl. 74—10)

The present invention relates to improvements in adjustment device, and more particularly to a device whereby the angular position of one of two interconnected shafts may be adjusted relative to the angular position of the other shaft.

There are numerous situations, as for example in connection with radio transmitters and receivers, in which it is desirable to rotate two separate control shafts simultaneously, the shafts being disposed in parallel relation or otherwise not in alignment. One instance of the above would comprise the concurrent adjustment of the usual spaced-apart condensers utilized for tuning purposes.

It is often desirable, however, to provide not only for the concurrent rotation of two such shafts, but also for the individual adjustment of one of these shafts relative to the other without disturbing in any way the setting of the shaft the adjustment of which is not being made. Conventional mechanisms for ganging together several condensers, for example, do not provide for this latter contingency.

It is accordingly the principal object of the present invention to provide a simple and inexpensive mechanism for permitting an individual adjustment of the angular position of one of two shafts, the two shafts being normally concurrently rotatable by means of a single control.

It is a further object of the present invention to provide a flexible coupling between two shafts, the coupling normally acting to cause simultaneous rotation of both shafts upon manipulation of a single control, and to additionally provide for the rotation of a single one of these shafts in response to a change in configuration of the coupling.

Further objects and advantages will be apparent from the following description of preferred forms of the invention and from the drawing, in which:

Fig. 1 is a perspective view of a preferred form of apparatus incorporating the present invention;

Fig. 2 is a set of diagrams illustrating the principle of operation of the form of the invention shown in Fig. 1; and Fig. 3 is another set of diagrams illustrating the principle of operation of a modified form of the apparatus shown in Fig. 1.

In Fig. 1 is shown a pair of rotatable shafts 6, 8, respectively mounted in bearings 7, 9, the latter contacting their respective shafts with different degrees of friction so that the shafts will have different degrees of resistance to rotation. As indicated, shaft 6 has a greater degree of resistance to rotation than shaft 8.

Shafts 6, 8 are positioned in substantially parallel relationship. Each of the shafts may be attached to any known type of device the operation of which may be controlled through such means, such for example as a variable condenser. A dial 10 is provided for manually actuating shaft 6. A pair of drums 12, 14 are securely mounted on shafts 6, 8 respectively. Drum 14 is partially hollow as shown.

An elongated flexible connecting member encircles, at least partially, each of the drums 12, 14. This flexible member preferably comprises a belt or rope 16 which is secured to drum 12 at point 18, the latter constituting the midpoint of the single turn of rope 16 around drum 12 as illustrated. Rope 16 is also wound once around drum 14, and the ends of the rope after passing through openings 19 in the wall of the drum, are joined together at 20. Thus the rope 16 has two portions 16a, 16b which are free of drums 12, 14 and extend therebetween. A spring or other resilient element 22 secured to the interior of drum 14 and also the junction point 20 of rope 16 acts to maintain the rope at the desired degree of tension, thus overcoming any loosening of the rope due to moisture or for other reasons.

Mounted between shafts 6, 8 is a third rotatable shaft 24, suitably pivoted by means such as a bearing 26. A handle 28 permits manual rotation of shaft 24.

Secured to shaft 24 is a support 30 positioning a pair of fingers 32, 34 in parallel spaced apart relation, these fingers being designed to pinch in the two portions 16a, 16b of rope 16 so as to keep these rope portions normally in a slightly bowed condition. Thus when handle 28 is in center position, the configuration of rope 16 is approximately as shown in Fig. 2A.

Rope 16 is designed to slide freely over fingers 32, 34. Therefore when handle 28 is in center position, and the fingers 32, 34 have the relation with rope portions 16a, 16b as shown in Fig. 2A, a manipulation of dial 10 to rotate shaft 6 will also rotate shaft 8 due to the action of rope 16, which as above described is secured both to drum 12 at point 18, and to drum 14 through spring 22. Thus means are provided for rotating both shafts 6, 8 simultaneously and in the same direction upon manipulation of a single control.

If it is now desired to rotate shaft 8 while maintaining the position of shaft 6, handle 28 is actuated. This actuation may be either clockwise or counterclockwise. If the actuation is counterclockwise, fingers 32, 34 will both move to the left as viewed in Fig. 2B. Rope portions 16a, 16b will assume the configuration shown therein, or in other words portion 16a will be straightened out, or shortened, and portion 16b will be further bowed, or lengthened.

The above mode of operation would normally result in drum 12 rotating clockwise and drum 14 rotating counterclockwise, each rotation being of the same magnitude. However, it has been stated that shafts 6, 8 have different degrees of resistance to rotation. Since shaft 6 has a greater degree of resistance to rotation than shaft 8, only drum 14 will rotate, and drum 12 will remain stationary. This is indicated in Fig. 2B, which shows the unchanged position of point 18, while point 20 has moved in a counterclockwise direction. In Fig. 2C the same elements have been shown after a clockwise rotation of handle 28.

In Fig. 3 two fingers 32', 34' mounted on support 35 have been positioned on the opposite side of drum 14 from that on which drum 12 is located. Fingers 32', 34' are now mounted for rotation about a pivot 38 by means of handle 40. A pair of pins 36 keep rope portions 16a, 16b away from the sides of drum 14 so as to permit effective operation of the adjusting assembly. The shaft 6 will, in this case, also have the greater resistance to rotation.

The principal difference between the operation of the device shown in Fig. 1 and the device of Fig. 3 is that in the former showing the drum 14 rotates in the same direction as handle 28, while in the latter a rotation of handle 40 counterclockwise produces a clockwise rotation of drum 14. As shown in Fig. 3B, this is due to the fact that rope portion 16a is lengthened and portion 16b shortened. In Fig. 3C the elements are shown after a clockwise rotation of handle 40.

While flexible connecting member 16 has been described as a rope or belt, other forms of flexible connectors such as a wire or cord may be employed in place thereof. Also it is not necessary that rope 16 be wound around drums 12, 14. Rope 16 can if desired encircle the shafts themselves without any intermediate means. Furthermore rope 16 need not encircle the shafts or drums for more than approximately a half turn, the only requirement being that the rope be in non-slipping relation therewith. In addition tensioning spring 22 may obviously be omitted if desired.

It should also be noted that whereas the means for keeping shafts 6, 8 under different degrees of tension has been described as a pair of bearings 7, 9 engaging the shafts with different degrees of friction, it will be clear that the degree of resistance to rotation of each shaft may depend wholly or in part on the nature of the device to which the shaft is connected. In the case of the usual variable condenser, for example, tension is controlled by a screw which is adjustable to regulate the amount of force required to actuate the rotor. Many other tension-controlling mechanisms will be readily apparent to those skilled in the art, and it should be understood that the invention is not limited to the one shown.

While I have described above the principles of my invention in connection with a specific embodiment and a modification thereof, it is to be clearly understood that this description is made only by way of example and not as a limitation on the scope of my invention as set forth in the objects of my invention and the accompanying claims.

I claim:

1. A pair of rotatable shafts interconnected by a belt-like driving element, means for relatively impeding the rotation of one shaft, means causing differential tensioning of two portions of the belt-like element between shafts to rotate the other shaft.

2. A pair of rotatable shafts interconnected for driving operation one by the other by a belt-like element, means for relatively impeding the rotation of one shaft, means causing differential tensioning of two portions of the belt-like element between shafts to rotate the other shaft.

3. A pair of rotatable shafts interconnected by a belt-like driving element, means for giving one shaft greater resistance to rotation than the other shaft, means for normally applying tension to both sides of the belt-like element, and means for adjusting said last-mentioned means to vary said tension differentially whereby one shaft is rotated independently of the other.

4. In combination, a pair of rotatable shafts, means respectively associated with each of said shafts for producing different degrees of resistance to rotation thereof, a belt-like member interconnecting said shafts, means for rotating one of said shafts, whereby upon operation of said last-mentioned means said belt-like member will cause simultaneous rotation of the other of said shafts, adjustable means normally acting to draw together the interconnecting portions of said belt-like member, and means for moving said adjustable means in a substantially lateral direction whereby upon operation of said last mentioned means said belt-like member will cause rotation of the shaft having the lesser degree of resistance to rotation only.

5. The combination of claim 4, in which said adjustable means is capable of movement laterally in opposite directions, resulting in a selective rotation in either direction of the shaft having the lesser degree of resistance to rotation.

6. In a device of the type in which a pair of control shafts are disposed side-by-side in substantially parallel relation, and in which a belt-like connecting member having its ends joined together encircles at least partially each of said shafts in non-slipping relation, thereby forming two portions of said belt-like member extending between said shafts, the combination of means respectively engaging each of said shafts for producing different degrees of resistance to rotation thereof, adjustable means contacting each of said belt-like member portions, and means for adjusting the position of said last mentioned means so as to decrease the effective length of one of said portions and increase the effective length of the other.

7. The combination of claim 6 in which said adjustable means includes a U-shaped element positioned so that the portions of said belt-like member extending between said shafts frictionally engage respective arms of said U-shaped element.

8. The combination of claim 6, with further means for rotating one of said shafts, whereby said belt-like connecting member will act to rotate concurrently the other of said shafts in response thereto.

9. In a mechanism including a pair of control shafts disposed side-by-side in substantially parallel relation, the combination of means respectively engaging each of said shafts for producing different degrees of resistance to rotation thereof, an elongated flexible connecting member having its ends connected together, said member being wound at least once around each shaft in non-slipping relation therewith, thereby forming two connections between said shafts in a plane perpendicular to the shafts, adjustable means disposed between said shafts and acting to draw said two connections together to tighten same, means for moving said adjustable means laterally, and means for rotating one of said shafts, whereby upon operation of said rotating means said flexible connecting member will cause a corresponding rotation of the other of said shafts, and whereby upon operation of said moving means said flexible connecting member will cause rotation of the shaft having the lesser degree of resistance to rotation only.

10. The combination of claim 9, further comprising resilient means connected to one of said shafts for maintaining said flexible connecting member under a desired degree of tension.

11. The combination of claim 9, further comprising a pair of drums respectively securely mounted on said shafts, said flexible connecting member being wound on said drums.

12. In a device having a pair of rotatable shafts disposed side-by-side in substantially parallel relation, the combination of flexible connecting means between said shafts, said means comprising a belt-like member having its ends connected together and at least partially encircling each of said shafts in non-slipping relation, thereby forming two portions of said member extending between said shafts, and adjustable means positioned on the opposite side of one of said shafts from the other of said shafts, said belt-like member slidably engaging said adjustable means, whereby upon selective adjustment of said adjustable means one of the said portions of said belt-like member will have its effective length increased, and the other of said portions will have its effective length decreased.

13. The combination of claim 12, with further stationary means slidably engaging each of said portions of said belt-like member to cause said member to assume a substantially outwardly-bowed configuration, thereby preventing contact with said one shaft of that section of each of said portions lying between said other shaft and said adjustable means.

14. The combination of claim 12, in which said adjustable means comprises a pivoted support, and a pair of fingers on said support and disposed on opposite sides of said pivot, the two said portions of said belt-like member respectively slidably engaging said fingers.

JOHN A. HERBST.